(12) United States Patent
Perng

(10) Patent No.: US 7,749,121 B2
(45) Date of Patent: Jul. 6, 2010

(54) TRANSMISSION STRUCTURE FOR AN ELECTRICALLY OPERATED BICYCLE

(76) Inventor: Te-Yu Perng, P.O. Box No. 6-57, Junghe, Taipei 235 (TW)

( * ) Notice: Subject to any disclaimer, the term of this patent is extended or adjusted under 35 U.S.C. 154(b) by 367 days.

(21) Appl. No.: 11/812,355

(22) Filed: Jun. 18, 2007

(65) Prior Publication Data
US 2008/0108475 A1    May 8, 2008

(30) Foreign Application Priority Data
Jun. 19, 2006    (TW) ................ 95210668 A

(51) Int. Cl.
  *F16H 3/72*    (2006.01)
  *F16D 21/04*    (2006.01)
  *F16D 11/06*    (2006.01)
  *B62D 61/02*    (2006.01)
(52) U.S. Cl. ................ 475/5; 192/20; 192/71; 180/220
(58) Field of Classification Search ............ 475/5, 475/150, 207, 210, 213; 192/20, 71; 180/65.1, 180/65.6, 205, 220
See application file for complete search history.

(56) References Cited
U.S. PATENT DOCUMENTS

| 4,445,604 | A | * | 5/1984 | Rogers, Jr. .............. 192/71 |
|---|---|---|---|---|
| 4,548,304 | A | * | 10/1985 | Nagata .................... 192/46 |
| 6,012,538 | A | * | 1/2000 | Sonobe et al. ............ 180/220 |
| 6,196,347 | B1 | * | 3/2001 | Chao et al. ............... 180/206 |
| 6,276,479 | B1 | * | 8/2001 | Suzuki et al. ............. 180/207 |
| 6,296,072 | B1 | * | 10/2001 | Turner .................... 180/220 |
| 6,629,574 | B2 | * | 10/2003 | Turner .................... 180/206 |
| 6,681,910 | B1 | * | 1/2004 | Schumann et al. ......... 192/71 |
| 2006/0003860 | A1 | * | 1/2006 | Fukui ....................... 475/5 |
| 2006/0090943 | A1 | * | 5/2006 | Perng ..................... 180/205 |

* cited by examiner

*Primary Examiner*—Roger Pang
(74) *Attorney, Agent, or Firm*—Chun-Ming Shih

(57) ABSTRACT

An improved structure of a transmission structure for an electrically operated bicycle, structured to include an electric mechanism and a pedal coaxially disposed on a pedal shaft of a bicycle. The present invention is characterized in that: a rotating shaft of the electric mechanism is a hollow tube that passes through two sides of the electric mechanism; the pedal shaft of the pedal mechanism penetrates and is disposed within the rotating shaft and is able to rotate therein; and the driving chain wheel is pivotal disposed on an outer side of the rotating shaft. One side of the driving chain wheel is coupled to the rotating shaft of the electric mechanism by means of a clutch, and the other side of the driving chain wheel is coupled to a pedal crank of the pedal mechanism by means of a unilateral bearing.

11 Claims, 5 Drawing Sheets

TRANSMISSION STRUCTURE FOR AN ELECTRICALLY OPERATED BICYCLE

BACKGROUND OF THE INVENTION (a) Field of the Invention

The present invention relates to an improved structure of a transmission structure for an electrically operated bicycle, and more particularly to a transmission structure that is simple, output torque is large, and enables automatic switching between electrical operation and pedal operation, thereby enabling a bicycle to achieve effectiveness to easily move forward.

(b) Description of the Prior Art

In general, electrically operated bicycles of prior art use a design that separates the electric mechanism from the manual pedal mechanism, which separately actuate a rear wheel to achieve the objective of moving the bicycle forward. A shortcoming of such prior art structures is that a switching device must be provided between the electrical operating means and the pedal operating means to control interchange between the two mechanisms. Hence, prior art structures are more complex, and relatively inconvenient in use. Moreover, because of the separate disposition of the electric mechanism and pedal mechanism in prior art structures, thus, the electric mechanism portion is unable to function in coordination with a variable speed multiple sprocket chain wheel, and only enables providing the pedal mechanism with functionality of multistage speed change (as found on variable speed bicycles of prior art); Furthermore, when prior art structures meet an inclined roadway and there is insufficient electric drive torque, the pedal mechanism is unable to assist the electric mechanism to drive the bicycle forward. Accordingly, prior art structures fall short for practical use, and thus there are areas for improvement.

In light of the aforementioned shortcomings of transmission structures of prior art electrically operated bicycles, the inventor of the present invention, having accumulated years of experience in related arts, has meticulously carried out extensive study and exploration to ultimately design a new improved structure of a transmission structure for an electrically operated bicycle.

SUMMARY OF THE INVENTION

A primary objective of the present invention is to provide an improved structure of a transmission structure for an electrically operated bicycle that has a simple structure, large rotating torque, wearproof, and is able to achieve automatic switching between electrical operation and pedal operation.

Another objective of the present invention is to provide the improved structure of a transmission structure for an electrically operated bicycle with a driving chain wheel which can be a multiple sprocket chain wheel, thereby achieving a variable speed electrically operated bicycle.

Yet another objective of the present invention is to provide the improved structure of a transmission structure for an electrically operated bicycle with functionality to coordinate with a forward and reverse switcher configuration to achieve an electrically operated bicycle that has functionality to move forward or backward.

In order to achieve the aforementioned objectives, the improved structure of a transmission structure for an electrically operated bicycle of the present invention is primarily structured to comprise an electric mechanism and a pedal mechanism. The electric mechanism and the pedal mechanism are coaxially disposed on a pedal shaft of a bicycle, and one of the mechanisms is automatically selected to drive and rotate the driving chain wheel. The present invention is characterized in that a rotating shaft of the electric mechanism is a hollow tube which passes through two sides of the electric mechanism. The pedal shaft of the pedal mechanism penetrates and is disposed within the aforementioned rotating shaft, and is able to rotate therein. The driving chain wheel is further pivotal disposed on an outer side of the rotating shaft, and one side of the driving chain wheel is coupled to the rotating shaft of the electric mechanism by means of a clutch, and the other side of the driving chain wheel is coupled to a pedal crank of the pedal mechanism by means of an unilateral bearing.

According to the aforementioned structural assembly, when rotational speed of the rotating shaft of the electric mechanism is relatively fast, then the clutch can be used to actuate the driving chain wheel, and when rotational speed of the rotating shaft of the electric mechanism is relatively slow or is not rotating, then both feet can be used to step on the pedal cranks to drive and rotate the driving chain wheel through the unilateral bearing, thereby achieving a dual purpose electrical operated and pedal operated transmission structure.

According to the aforementioned configuration, when the driving chain wheel is a multiple sprocket chain wheel of a variable speed bicycle of prior art, then the electrically operated bicycle of the present invention is a bicycle having manual or automatic gear transmission functionality. Moreover, when the clutch has a bidirectional driver enabled configuration, then the electrically operated bicycle also has function to drive the bicycle in reverse, suitable for use in electrically operated tricycles or vehicles for the physically disabled.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
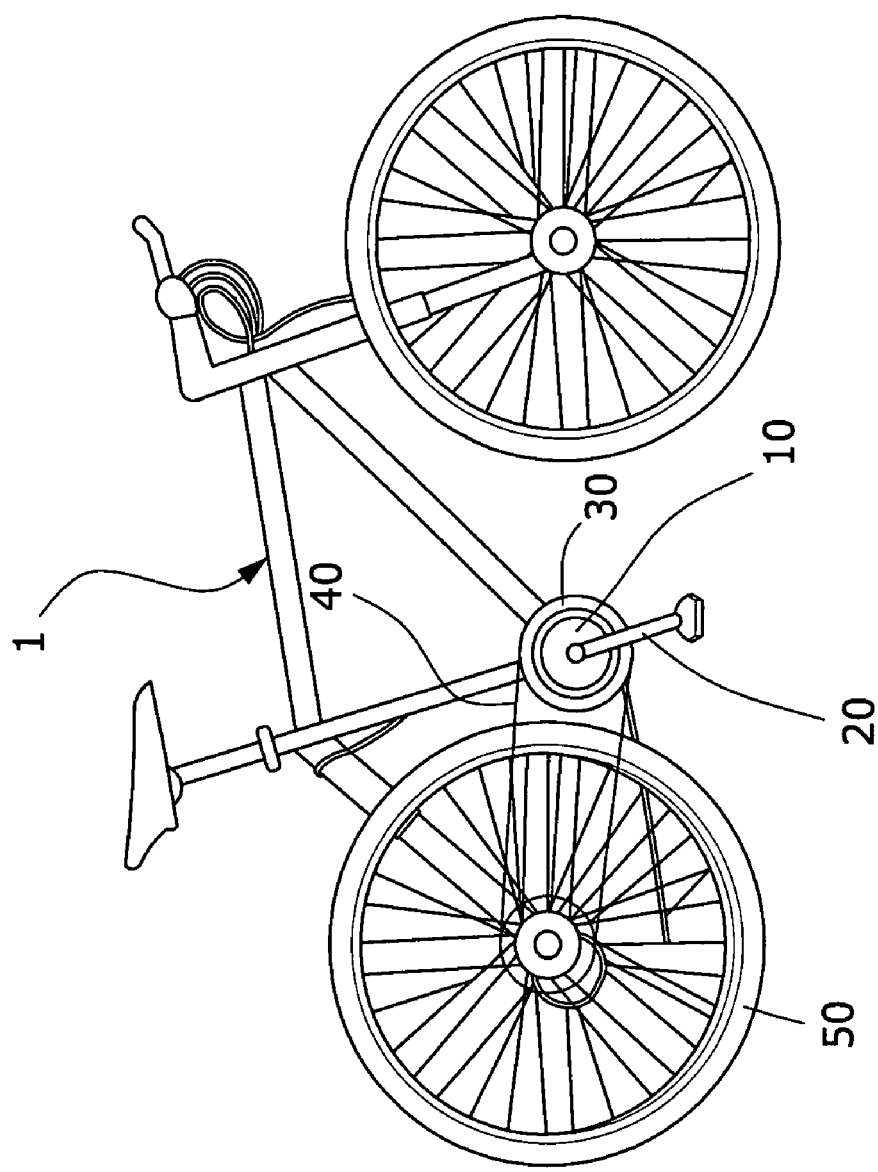
FIG. 1 shows a schematic view of a simple embodiment of the present invention.

Referring to FIG. 1, which shows a schematic view of the entire body of an electrically operated bicycle, wherein an electrically operated bicycle 1 is provided with an electric mechanism 10 coaxially installed at a pedal shaft position of a traditional pedal mechanism 20, thereby enabling the pedal mechanism 20 or/and the electric mechanism 10 to be used to drive and rotate a driving chain wheel 30, which then drives and rotates a rear wheel 50 by means of a chain 40, thereby driving the electrically operated bicycle 1 forward.

Figure 2:
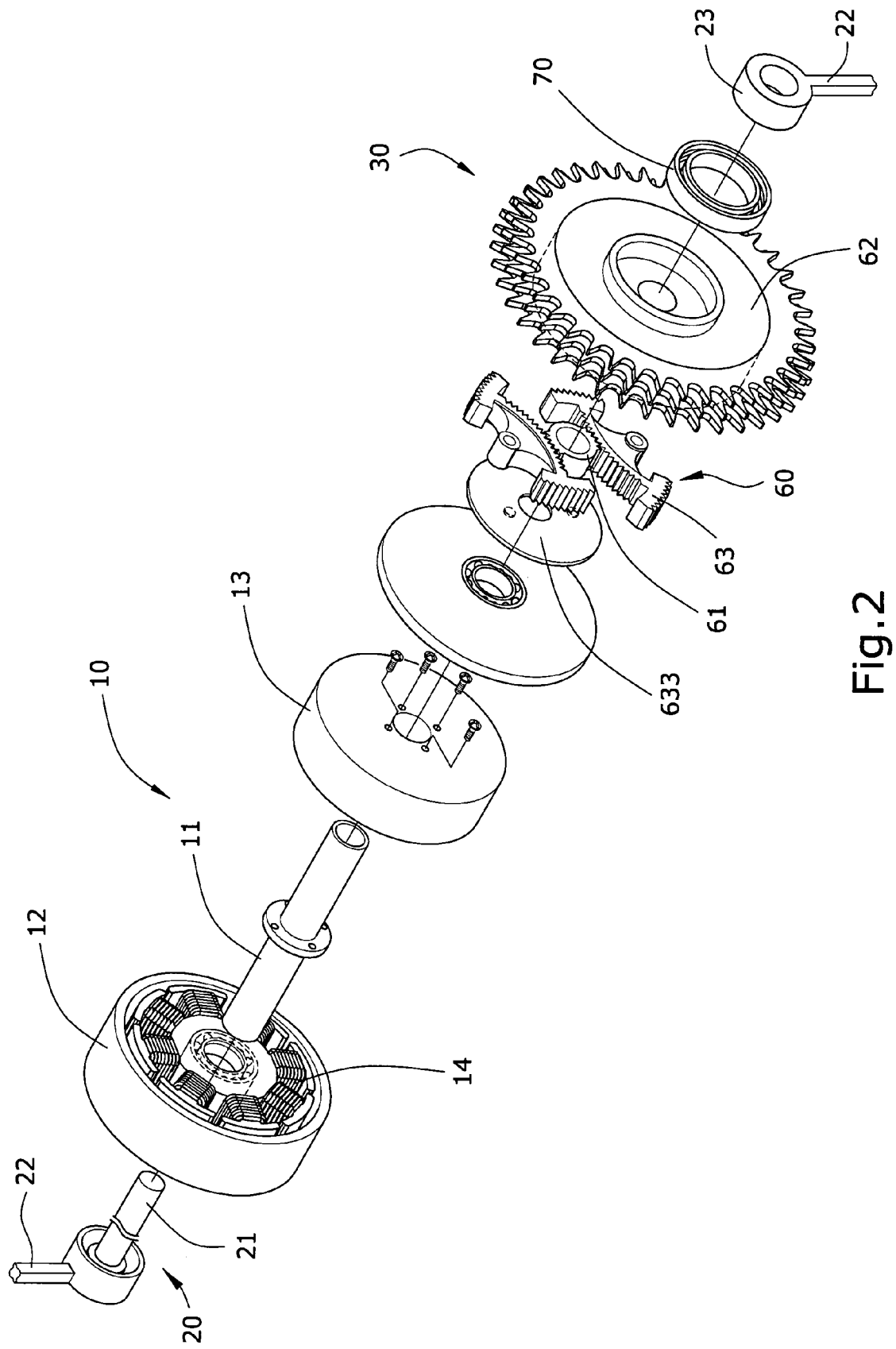
FIG. 2 shows an exploded elevational view of an embodiment according to the present invention.
Figure 3:
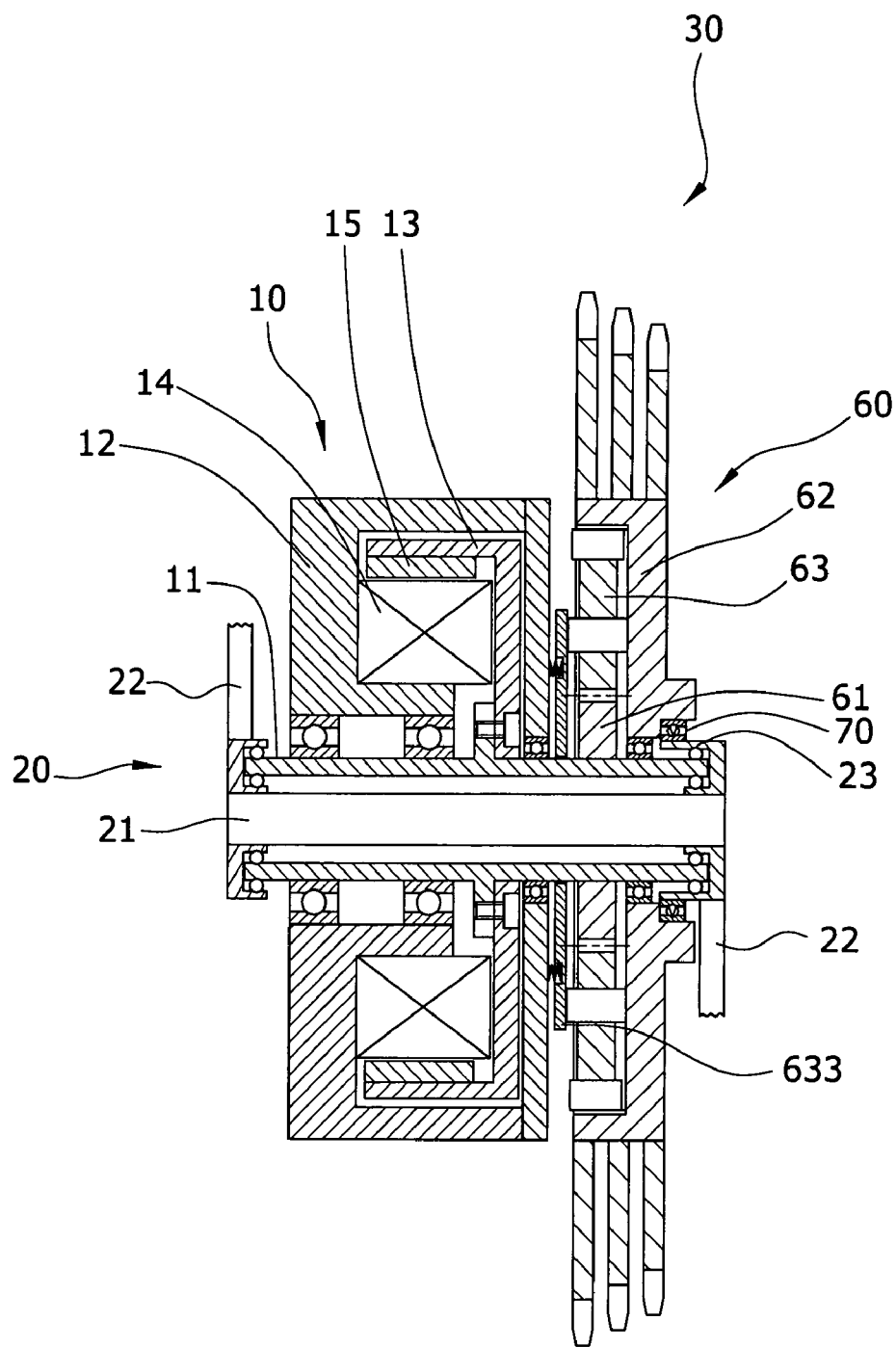
FIG. 3 shows a cross-sectional view of FIG. 2 assembled according to the present invention.

Referring to FIGS. 2 and 3, which show a feasible embodiment of a transmission structure of the present invention, primary structure and characteristics of which include: a rotating shaft 11 of the electric mechanism 10 that is a hollow tube which passes through two sides of the electric mechanism 10; a pedal shaft 21 of the pedal mechanism 20 that penetrates and is disposed within the aforementioned rotating shaft 11, and which is able to rotate therein; and the driving chain wheel 30 which is pivotal disposed on an outer side of the rotating shaft 11. One side of the driving chain wheel 30 is coupled to the rotating shaft 11 of the electric mechanism 10 by means of a clutch 60, while the other side of the driving chain wheel 30 is coupled to a pedal crank 22 of the pedal mechanism 20 by means of an unilateral bearing 70.

The electric mechanism 10 of the aforementioned embodiment is structured to comprise the rotating shaft 11, a fixed portion 12, a rotating portion 13, a magnet winding 14 and a permanent magnet 15. An outer housing of the fixed portion 12 is fixed to the frame of the electrically operated bicycle 1. The magnet winding 14 and the permanent magnet 15 are correspondingly fixed to the fixed portion 12 and the rotating portion 13, and the rotating shaft 11 and the rotating portion 13 are fixedly locked to form an integrated body. An electromagnetic induction effect is used to cause the rotating portion 13 to drive and rotate the rotating shaft 11, movement of which is transmitted to the driving chain wheel 30 connected thereto through the clutch 60. The pedal mechanism 20 comprises the pedal crank 22 fixed to each of two ends of the pedal shaft 21, and an extended portion 23 is located on one of the two pedal cranks 22 and extends to within the driving chain wheel 30, and the unilateral bearing 70 is coupled between the driving chain wheel 30 and the extended portion 23. When the pedal mechanism 20 is rotating, the driving chain wheel 30 is driven via the unilateral bearing 70 to enable unidirectional rotation.

According to the aforementioned structural combination, when in use, the coaxial configuration of the electric mechanism 10 and the pedal mechanism 20 of the present invention enables them to act in unison on the driving chain wheel 30. Moreover, because the driving chain wheel 30 can be a single sprocket chain wheel or a multiple sprocket chain wheel (the drawings depict a multiple sprocket chain wheel set), thus, the electrically operated bicycle 1 of the present invention is able to make use of bicycle gear change structures of prior art, and thereby provide the electrically operated bicycle 1 with a manual or automatic gear shifting function. Furthermore, because the present invention has the unilateral bearing 70 coupled between one of the pedal cranks 22 of the pedal mechanism 20 and the driving chain wheel 30, thus, when the electric mechanism 10 is driving and rotating the driving chain wheel 30 at a relatively fast speed, then the pedal mechanism 20 is, by contrast in an idle state. On the contrary, If traveling uphill results in insufficient power output from the electric mechanism 10 or when there is no electric power, then the electric mechanism 10 drives and rotates the driving chain wheel 30 at a relatively slow speed or the driving chain wheel 30 stops rotating completely, at which time manual pedaling can be applied to the pedal mechanisms 20 to drive and rotate the driving chain wheel 30 through the unilateral bearing 70, thereby achieving effectiveness to enable automatic switching between electrical operation and pedal operation. Moreover, the pedal mechanisms 20 can be used in coordination with the electric mechanism 10 to drive the electrically operated bicycle 1 forward.

Figure 4:
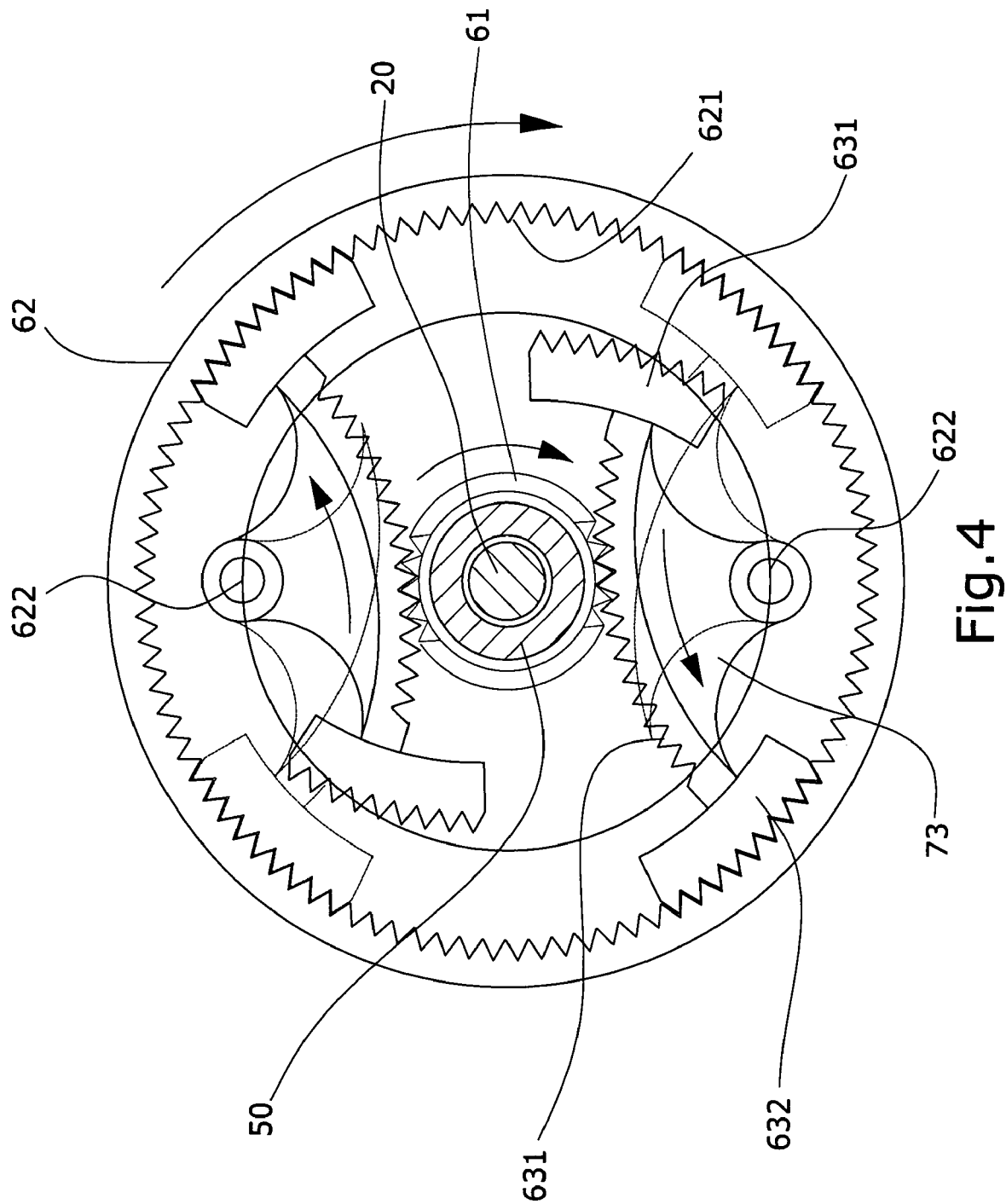
FIG. 4 shows a plane schematic view of a clutch according to the present invention.

Referring to FIGS. 3 and 4, which show an embodiment of the aforementioned clutch 60 of the present invention structured to comprise a gear 61, a disk 62 and two braking devices 63, wherein the gear 61 is fixed to the rotating shaft 11 of the electric mechanism 10, and the disk 62 assumes a dish shape and is pivotal disposed on the rotating shaft 11 corresponding to position of the gear 61. Moreover, a braking surface 621 is formed on a circumferential inner side of the disk 62, and the braking surface 621 can be an inner toothed surface or other rough surface. The two braking devices 63 assume fan shapes, and are symmetrically pivotal disposed in an inner space of the disk 62 by means of a pressure plate 633. A fan-shaped outer side edge of each of the braking devices 63 is provided with outer teeth 631 which mutually mesh with the aforementioned gear 61, and braking plates 632 are respectively located on two ends of the fan shapes. Accordingly, during positive rotation (clockwise rotation) of the rotating shaft 11 of the electric mechanism 10, the gear 61 respectively actuates leftward and rightward displacement of the braking devices 63, thereby causing the end braking plates 632 to make contact with the braking surface 621 of the disk 62 (as depicted by the solid line state in FIG. 4), thus driving and producing positive rotation (clockwise rotation) of the disk 62. On the contrary, negative rotation of the disk 62 can be effected ((as depicted by the dashed line state in FIG. 4), thereby enabling achieving forward or backward driving of the electrically operated bicycle 1. Furthermore, in an embodiment of the aforementioned disk 62, the disk 62 is joined to the driving chain wheel 30 to form an integrated body (or they can be the same component member).

Figure 5:
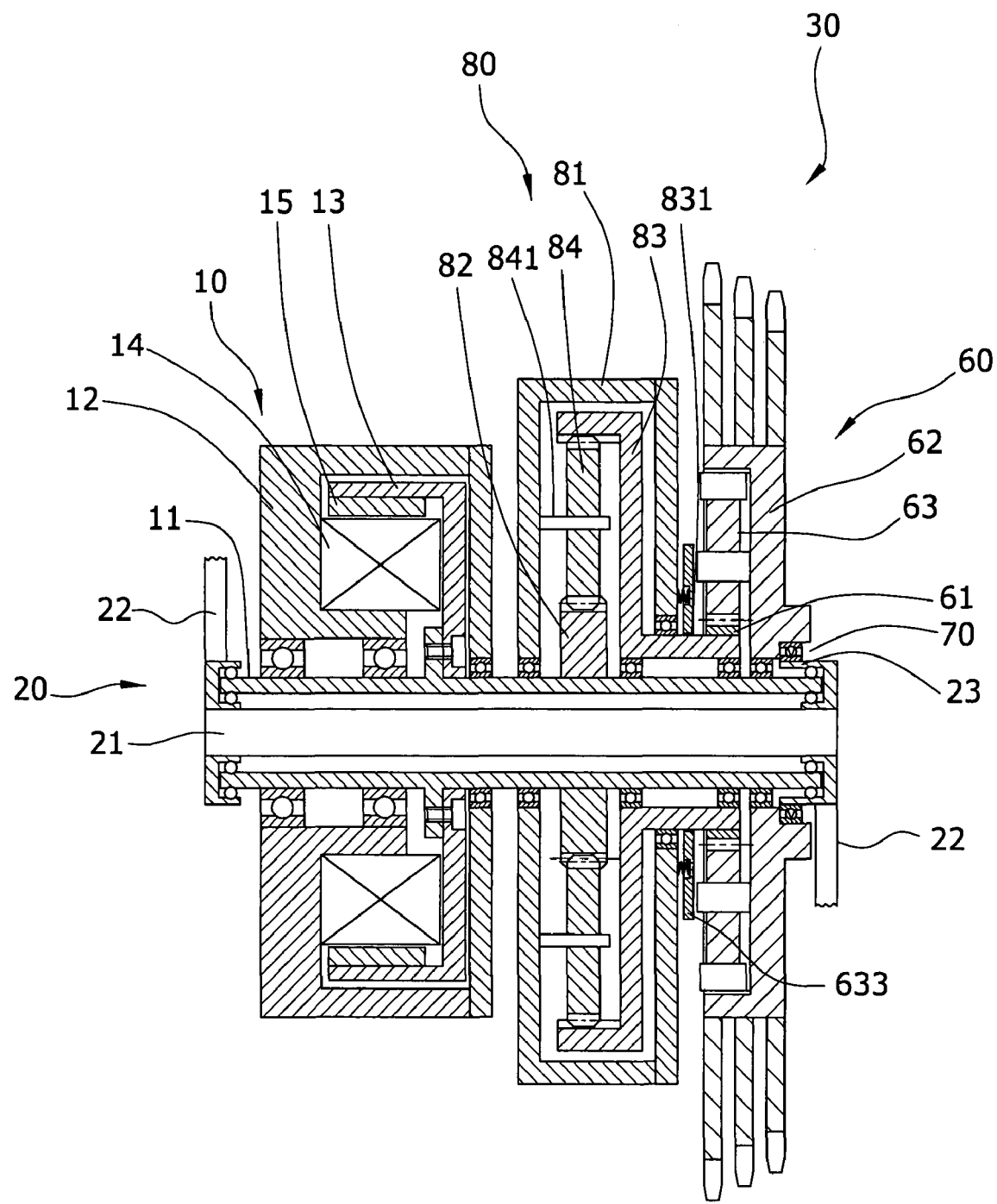
FIG. 5 shows a cross-sectional view of an assemblage of another embodiment according to the present invention.

Furthermore, if torque output of the transmission structure of the aforementioned configuration is further increased, then a decelerating mechanism 80 (see FIG. 5) can be installed on the rotating shaft 11 between the electric mechanism 10 and the clutch 60 to increase driving torque and effectiveness. The decelerating mechanism 80 is a planetary decelerating mechanism, which comprises a housing 81, within which encompasses an assemblage of a pinion gear 82, an internal toothed disk 83 and a plurality of planetary gears 84. The pinion gear 82 and the rotating shaft 11 are joined to form an integrated body, and the plurality of planetary gears 84 are annular configured between the pinion gear 82 and the internal toothed disk 83. Moreover, short shafts 841 are fixed to the housing 81. The planetary gears 84 simultaneously mutually mesh with and drive the pinion gear 82 and the internal toothed disk 83. An outer tube body 831 outwardly extends from the center of the internal toothed disk 83, and an end portion of the outer tube body 831 is joined to the gear 61 of the aforementioned clutch 60 to form an integrated body. According to the aforementioned assembly, when in use, the decelerating mechanism 80 causes the rotating shaft 11 of the electric mechanism 10 to decelerate, and output torque of the force transmitted by the rotating shaft 11 is increased, whereupon transmission through the clutch 60 drives the driving chain wheel 30 and moves the bicycle forward.

In conclusion, the improved structure of a transmission structure for an electrically operated bicycle of the present invention assuredly achieves functionality of automatic switching between electrical operation and pedal operation and maximum operational effectiveness, and is a completely new structural configuration. Moreover, practicability and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A transmission structure for an electrically operated bicycle, comprising an electric mechanism and a pedal mechanism; wherein the electric mechanism and the pedal mechanism are coaxially disposed on a pedal shaft of a bicycle, and one of the mechanisms is automatically selected to drive and rotate a driving chain wheel, wherein:
a rotating shaft of the electric mechanism is a hollow tube that passes through two sides of the electric mechanism; the pedal shaft of the pedal mechanism penetrates and is disposed within the rotating shaft and is able to rotate therein; and the driving chain wheel is pivotal disposed on an outer side of the rotating shaft, one side of the driving chain wheel is coupled to the rotating shaft of the electric mechanism by means of a clutch, and the other side of the driving chain wheel is coupled to a pedal crank of the pedal mechanism by means of an unilateral bearing, and the clutch comprises a gear, a disk and two braking devices; the gear is fixed to the rotating shaft of the electric mechanism, and the disk assumes a dish shape and is pivotal disposed on the rotating shaft corresponding to position of the gear, and a braking surface is formed on a circumferential inner side of the disk; the two braking devices assume fan shapes, and are symmetrically pivotal disposed in an inner space of the disk by means of a pressure plate; a fan-shaped outer side edge of each of the braking devices is provided with outer teeth which mutually mesh with the gear, and braking plates respectively located on two ends of the fan shapes enable mutual contact and coupling with the braking surface of the disk.

2. The transmission structure for an electrically operated bicycle according to claim 1, wherein the electric mechanism comprises the rotating shaft, a fixed portion, a rotating portion, a magnet winding and a permanent magnet; an outer housing of the fixed portion is fixed to the frame of the electrically operated bicycle, the magnet winding and the permanent magnet are correspondingly fixed to the fixed portion and the rotating portion, and the rotating shaft and the rotating portion are fixedly locked to form an integrated body; an electromagnetic induction effect is used to cause the rotating portion to drive and rotate the rotating shaft.

3. The transmission structure for an electrically operated bicycle according to claim 1, wherein an extended portion is located on one of the pedal cranks of the pedal mechanism and extends to within the driving chain wheel, and the unilateral bearing is coupled between the driving chain wheel and the extended portion.

4. The transmission structure for an electrically operated bicycle according to claim 1, wherein the disk of the clutch is joined to the driving chain wheel to form an integrated body.

5. The transmission structure for an electrically operated bicycle according to claim 1, wherein a decelerating mechanism is additionally installed on the rotating shaft between the electric mechanism and the clutch.

6. The transmission structure for an electrically operated bicycle according to claim 5, wherein the decelerating mechanism is a planetary decelerating mechanism, comprising a housing, within which encompasses an assemblage of a pinion gear, an internal toothed disk and a plurality of planetary gears; the pinion gear and the rotating shaft are joined to form an integrated body, and the plurality of planetary gears are annular configured between the pinion gear and the internal toothed disk, and short shafts are fixed to the housing; the planetary gears simultaneously mutually mesh with and drive the pinion gear and the internal toothed disk; an outer tube body outwardly extends from the center of the internal toothed disk, and an end portion of the outer tube body is joined to the gear of the clutch to form an integrated body.

7. A transmission structure for an electrically operated bicycle, comprising an electric mechanism and a pedal mechanism; wherein the electric mechanism and the pedal mechanism are coaxially disposed on a pedal shaft of a bicycle, and one of the mechanisms is automatically selected to drive and rotate a driving chain wheel, wherein:
a rotating shaft of the electric mechanism is a hollow tube that passes through two sides of the electric mechanism; the pedal shaft of the pedal mechanism penetrates and is disposed within the rotating shaft and is able to rotate therein; and the driving chain wheel is pivotal disposed on an outer side of the rotating shaft, one side of the driving chain wheel is coupled to the rotating shaft of the electric mechanism by means of a clutch, and the other side of the driving chain wheel is coupled to a pedal crank of the pedal mechanism by means of an unilateral bearing, and a decelerating mechanism is additionally installed on the rotating shaft between the electric mechanism and the clutch, wherein the decelerating mechanism is a planetary decelerating mechanism, comprising a housing, within which encompasses an assemblage of a pinion gear, an internal toothed disk and a plurality of planetary gears; the pinion gear and the rotating shaft are joined to form an integrated body, and the plurality of planetary gears are annular configured between the pinion gear and the internal toothed disk, and short shafts are fixed to the housing; the planetary gears simultaneously mutually mesh with and drive the pinion gear and the internal toothed disk; an outer tube body outwardly extends from the center of the internal toothed disk, and an end portion of the outer tube body is joined to a gear of the clutch to form an integrated body.

8. The transmission structure for an electrically operated bicycle according to claim 7, wherein the electric mechanism comprises the rotating shaft, a fixed portion, a rotating portion, a magnet winding and a permanent magnet; an outer housing of the fixed portion is fixed to the frame of the electrically operated bicycle, the magnet winding and the permanent magnet are correspondingly fixed to the fixed portion and the rotating portion, and the rotating shaft and the rotating portion are fixedly locked to form an integrated body; an electromagnetic induction effect is used to cause the rotating portion to drive and rotate the rotating shaft.

9. The transmission structure for an electrically operated bicycle according to claim 7, wherein an extended portion is located on one of the pedal cranks of the pedal mechanism and extends to within the driving chain wheel, and the unilateral bearing is coupled between the driving chain wheel and the extended portion.

10. The transmission structure for an electrically operated bicycle according to claim 7, wherein the clutch comprises a gear, a disk and two braking devices; the gear is fixed to the rotating shaft of the electric mechanism, and the disk assumes a dish shape and is pivotal disposed on the rotating shaft corresponding to position of the gear, and a braking surface is formed on a circumferential inner side of the disk; the two braking devices assume fan shapes, and are symmetrically pivotal disposed in an inner space of the disk by means of a pressure plate; a fan-shaped outer side edge of each of the braking devices is provided with outer teeth which mutually mesh with the gear, and braking plates respectively located on two ends of the fan shapes enable mutual contact and coupling with the braking surface of the disk.

11. The transmission structure for an electrically operated bicycle according to claim 10, wherein the disk of the clutch is joined to the driving chain wheel to form an integrated body.

* * * * *